United States Patent [19]

Jacobson

[11] Patent Number: 5,292,551
[45] Date of Patent: Mar. 8, 1994

[54] PROCESS FOR PRODUCING ELECTROCONDUCTIVE POWDERS

[75] Inventor: Howard W. Jacobson, Wilmington, Del.

[73] Assignee: E. I. Du Pont de Nemours and Company, Wilmington, Del.

[21] Appl. No.: 906,076

[22] Filed: Jun. 29, 1992

[51] Int. Cl.$^5$ ............................................. B05D 5/12
[52] U.S. Cl. .................................... 427/215; 252/518
[58] Field of Search .................... 252/518; 427/215; 428/404; 423/89

[56] References Cited

U.S. PATENT DOCUMENTS

| | | | |
|---|---|---|---|
| 4,775,412 | 10/1988 | Nishikura et al. | 252/518 |
| 5,068,063 | 11/1991 | Tremper, III | 252/518 |
| 5,071,676 | 12/1991 | Jacobson | 252/518 |
| 5,104,583 | 4/1992 | Richardson | 252/518 |
| 5,114,756 | 5/1992 | Mirabeau et al. | 427/412.3 |

FOREIGN PATENT DOCUMENTS

| | | |
|---|---|---|
| 0025583 | 3/1981 | European Pat. Off. . |
| 0359569 | 3/1990 | European Pat. Off. . |
| 0459552 | 12/1991 | European Pat. Off. . |
| 3842330 | 6/1990 | Fed. Rep. of Germany . |
| 61-063520 | 4/1986 | Japan . |
| 62-216105 | 9/1987 | Japan .................................. 427/215 |
| 1-111727 | 4/1989 | Japan .................................. 427/215 |
| 4-62713 | 2/1992 | Japan .................................. 252/518 |
| 2252551 | 8/1992 | United Kingdom . |
| 2253839 | 9/1992 | United Kingdom . |

OTHER PUBLICATIONS

Tsunashima, A. et al., "Preparation and properties of antimony-doped SnO$_2$ films by thermal decomposition of tin 2-ethylhexanoate", Journal of Materials Science 21 (1986) pp. 2731–2734.

Primary Examiner—Terry J. Owens
Attorney, Agent, or Firm—Michael K. Boyer

[57] ABSTRACT

A method for preparing electroconductive powders by applying a surface coating comprising amorphous silica, and an electro-conducting network of antimony-containing tin oxide crystallites. The process simultaneously applys silica in association with an antimony-containing tin oxide.

11 Claims, 1 Drawing Sheet

PROCESS FOR PRODUCING ELECTROCONDUCTIVE POWDERS

FIELD OF THE INVENTION

The present invention relates to an improved method for preparing electroconductive powders (ECP) comprising a coating of antimony-containing tin oxide.

BACKGROUND OF THE INVENTION

Electroconductive compositions and a process for preparing them are described in European Patent Application Publication No. 0359569, which published on Mar. 21, 1990, and is entitled "IMPROVED ELECTROCONDUCTIVE COMPOSITION AND PROCESS OF PREPARATION". The process described in European Patent Publication No. 0359569 (hereinafter referred to as "EPO '569"), for preparing ECP compositions requires providing a substrate comprising an amorphous hydroxylated or active silica-containing material. The hydroxyl groups on the substrate may enhance the chemical interaction among the silica-containing solid, and an aqueous solution of tin and antimony salts in order to form the desired ECP compositions. The substrate was prepared by coating a finely divided core material with silica prepared in an active form by adding an aqueous solution of an alkali silicate, such as sodium silicate or potassium silicate and a mineral acid, such as sulfuric acid or hydrochloric acid to an agitated suspension of core material. The core material was optionally removed to produce a hollow silica shell.

A coating layer comprising hydrous oxides of tin and antimony was then applied to the hydroxylated silica substrate surface by adding aqueous solutions of hydrolyzable tin and antimony salts to a slurry of the substrate.

SUMMARY OF THE INVENTION

In accordance with the present invention, a substrate can be coated to obtain an electronductive powder (ECP), in the absence of a hydroxylated silica or active silica core. The process of the invention obviates the need for a separate step to provide a hydroxylated silica surface, and therefore, achieves a significant economic advantage in comparison to conventional ECP preparation methods. In other words, the present invention can obtain an ECP by simultaneously depositing silica and an antimony containing tin oxide precursor, e.g., a hydroxide, upon at least a portion of a substrate, e.g., a substrate which was conventionally employed to form only a silica shell.

The present invention can be accomplished by concurrently adding solutions of an alkali silicate, antimony salt, and a tin salt into an agitated aqueous suspension of the substrate particles while maintaining the pH in the range of about 1.0 to 4.0. The resultant ECPs typically range in size from sub-micron up to a few microns, and possess an exterior coating or layer comprising silica or a silica-containing material, and an electoconducting network of antimony-containing tin oxide crystallites.

The present ECP compositions are capable of imparting electroconductive properties, for example, to thin films. ECPs are also useful in certain applications which require surface conductivity. When formulated with appropriate binders, additives, among others, ECPs of the invention can be used for coating glass, paper, corrugated box-board, plastic film or sheet such as polycarbonate, polyester and polyacrylate, among many others. The ECPs of the invention can also be employed to produce electroconducting paints.

The method of the present invention generally comprises the steps of:

(a) preparing an agitated aqueous suspension of substrate particles, (b) applying a coating layer, which comprises silica and hydrous oxides of antimony and tin, to the exterior substrate surface, (c) recovering the coated substrates, washing the substrates to obtain coated substrates which are substantially free from residues, and;

(d) drying and calcining the coated substrates.

DETAILED DESCRIPTION OF THE INVENTION

Figure 1:
FIG. 1 is a photomicrograph taken at 300,000×magnification of a portion of an ECP which can be produced in accordance with the present invention.

The present invention is directed to an improved method for preparing an electroconductive powder (ECP) composition that are related to those described in European Patent Application Publication No. 0359569, which published on Mar. 21, 1990, and is entitled "IMPROVED ELECTROCONDUCTIVE COMPOSITION AND PROCESS OF PREPARATION" (hereinafter referred to as "EPO '569"); the entire content of which is hereby incorporated by reference. The ECPs, which are prepared by the present method, comprise a substrate wherein at least a portion of the substrate has a two-dimensional coating. The coating typically comprises tin oxide crystallites, which contain about 1 to 30 wt % antimony, that is associated with silica or a silica-containing material. The coating is typically about 5 to 20 nm in thickness, and may cover at least a portion of the surface of a substrate particle which has major dimensions that are ten to ten thousand times as large as the thickness of the coating layer. The tin oxide crystallites typically form an interconnected two dimensional electrically conducting layer, which surrounds the substrate, i.e., the layer is sufficiently interconnected about the substrate in order for an individual coated substrate to conduit electricity.

Moreover, when present in sufficient concentrations, a plurality of ECPs in the form of finely divided coated substrate particles are capable of forming an electroconductive network. These ECPs can be incorporated within a carrier matrix and/or a solution which is applied, and dried on a surface to produce a thin film. Virtually an unlimited array of materials may serve as a carrier matrix. Suitable carrier matrix materials include polymeric substances, paints, fibers, shaped articles, among many others.

Whenever used in the specification and appended claims the terms below are intended to have the following definitions.

"Amorphous silica" as used herein refers to a phase which can be interdispersed around and/or within antimony-containing tin oxide, e.g., hydrous antimony containing tin oxide. The silica is predominantly amorphous and lacks any long-range crystalline structure.

"Electroconducting network of crystallites" as used herein refers generally to a characteristic of the coating upon a substrate. The coating is sufficiently thin to be represented by a two-dimensional layer of crystallites which cover at least a portion of the exterior surface of the particulate substrate. While the coating can substantially completely surround the substrate, so long as a sufficient quantity of the crystallites are interconnected the coating can form an open network which is electrically conductive. Although particular emphasis has been placed upon a coated substrate or ECP, the electroconducting network of crystallites also refers to a characteristic of an individual crystallite, a coating of crystallites upon an individual substrate, a plurality of coated substrates, and a plurality of coated substrates within a matrix, e.g., paint, plastic, among many others.

"Antimony-containing tin oxide" as used herein refers to the electrically conductive portion of the network of crystallites. The morphology of the crystallites corresponds generally to the structure of tin oxide. At least a portion of the tin within the crystallite lattice or matrix of the tin oxide has been substituted with antimony, thereby causing the crystallite to become electrically conductive. While antimony oxide may be present on an atomic level, significant quantities of antimony oxide are not detectable in the ECP, e.g., the antimony is typically free or uncombined.

As the quantity of antimony within the tin oxide coating layer increases, the resistivity of the finished dry powder decreases, i.e., the conductivity increases. Generally, the antimony content of the coating can range from about 1 to 30% by weight, but desirable properties can be obtained when the antimony content is about 3-10% antimony by weight, e.g., when the ECP is employed to dissipate static. For example, the dry powder resistance of the ECP was measured, and typically ranged from about 1-2000 ohms, and usually 10-100 ohms.

"Associated with a silica or silica-containing material" as used herein refers to the manner in which the silica or silica containing material relates to the antimony-containing tin oxide. Examples of silica or a silica-containing material include at least one of amorphous silica, mica, among others. These materials can become micro- and/or macroscopically intertwined with the antimony-containing tin oxide as a result of the coating process of the invention, i.e., the silica material and the antimony containing tin oxide are simultaneously coprecipitated or deposited upon the substrate.

In the method of the present invention, the process comprises forming a coating, which comprises amorphous silica and hydrous oxides of an antimony-containing tin oxide, upon dispersed substrate particles. The method comprises generally the steps of:
(a) providing an aqueous suspension of particulate substrates;
(b) applying a coating layer comprising amorphous silica and hydrous oxides of an antimony-containing tin oxide to the substrate surface;
(c) recovering the coated substrates, washing the substrates substantially free of residues and drying; and
(d) calcining the coated substrate.

Particulate substrates which are useful in the process of the invention comprise inorganic particulate materials. Suitable substrate materials typically are substantially insoluble in an aqueous environment, e.g., deionized water, which has a pH from about 1 to 5. Inorganic oxide powders are desirable substrates, e.g., the oxides of titanium, magnesium, calcium, barium, strontium, tin, nickel, iron, among others. The inventive process is also applicable to substrates which are complex oxides such as mica, cordierite, anorthite, pyrophyllite, among others. In addition to oxides, sulfates such as those of calcium, barium, strontium, among others, may be used as substrate particles in the process of the invention. The concentration of the particulate substrate material in the aqueous suspension is not a critical aspect of the invention, e.g., the particulate concentration can range from 100 to 600 g/liter. In some cases, it is beneficial to add small amounts of a surfactant, such as triethanolamine, to the aqueous suspension in order to enhance the particle dispersion.

The average diameter of suitable substrate particles ranges from submicron to tens of microns, and normally is in the range of about 0.1 to 20 microns. The surface area of particulate substrates, as measured by nitrogen absorption, can range between about 0.1 to 50 $m^2/g$, and most commonly between 2 and 20 $m^2/g$. In general, the surface area will be in the lower portion of this range for high density substrate particulates, and in the upper portion of this range for relatively low density substrates. The shape of substrate particles may vary widely, for example one or more of hollow and/or solid spherical particles, rods, whiskers, fibers, needles, platelets, among others. It will be appreciated that the shape of the substrates, that are selected for coating, by the invention will depend primarily upon the intended end-use of the ECP. For example, acicular substrate particles are generally preferred for use in paint or thin-films, and equiaxial shaped particles for use as fillers in plastics. Accordingly, by appropriately selecting a substrate, the characteristics of the finished ECP can be tailored to satisfy a wide range of end uses.

The process of the present invention begins by applying a surface coating or layer, which comprises amorphous silica and the hydrous oxides of an antimony-containing tin oxide, to at least a portion of the substrate's exterior surface. The coating can be obtained by concurrently admixing starting materials into an agitated aqueous suspension, which contains the substrate particles, and typically has a temperature in the range of about 25° to 100° C. Suitable precursors for the coating comprise a soluble silicate such as sodium silicate, potassium silicate, among others, and a mixture comprising salts of antimony and tin, e.g., $SnCl_4$ and $SbCl_3$ in a hydrochloric acid solution. The pH of the suspension is normally maintained in a range of about 1.0 to 4.0 by the controlled addition of an alkali such as NaOH. In order to accomplish the concurrent admixing, it is desirable to inject the precursor materials at precisely monitored rates into a vigorously agitated mixing zone of the suspension. Typically, the precursor materials are added over a period which can range from about one to four hours. Should the admixing occur too rapidly, such can result in a non-uniform substrate coating, whereas relatively slow admixing can unnecessarily prolong operation of the process.

While any suitable means can be used to establish the agitated mixing zone in the suspension, it is desirable to use a stirred paddle arrangment. By agitating the suspension, which contains the precursor materials, the invention obtains at least partially coated substrates which have a coating that comprises amorphous silica along with an antimony containing tin oxide.

A convenient form of the soluble silicate, which is admixed with the suspension of substrate particles, comprises an aqueous solution of $SiO_2/Na_2O$, $SiO_2/K_2O$, among others, which can have a ratio of about 3.25/1. For best results, the silicate has been filtered to substantially remove insoluble residues. A range of about 2 to 50% by weight silica, and normally about 6 to 25%, based on the amount of substrate particles, can be introduced into the suspension.

The tin salt solution, which is admixed with the suspension, may conveniently be prepared by dissolving $SnCl_4 \cdot 5H_2O$ in water. The antimony salt solution may conveniently be prepared by dissolving $SbCl_3$ in nominal approximately 37% aqueous HCl. Typically, tetravalent tin salts and trivalent antimony salts are used to obtain the salt solutions. Sn and Sb chlorides are the particularly desirable salts, but one or more salts, such as, sulfates, nitrates, oxalates, acetates, among others, can also be employed to obtain the salt solutions. While tin and antimony salt solutions may be added concurrently to the aqueous suspension of substrate particles, it is usually more convenient to first mix the salt solutions together, and then add the mixed solutions to the suspension. Although the salt solution concentration is not a critical aspect of the invention, the invention is expediently practiced when salt concentrations are maintained within ranges of about 50 to 500 g of tin oxide/liter and about 0.5 to 250 g of antimony/liter. Such a concentration of salt solution also facilitates substantially uniform substrate coating while avoiding unnecessary dilution.

When introducing the precursor or starting materials into the substrate suspension, the pH of the suspension is maintained substantially constant at a value from about 1.0 to 4.0, and normally about 2.0. The pH is maintained at these values by adding controlled quantities of an alkali solution, e.g., NaOH, KOH, among others, to the suspension. Brief excursions of pH to levels above or below the 1.0 to 4.0 range are generally not harmful, but prolonged practice of the invention substantially outside this pH range can degrade the continuity of the two-dimensional network of antimony-containing tin oxide crystallites. Such degradation can adversely effect the conductive properties of the resultant ECP.

In a key aspect of the invention, the substrate coating process is practiced in the presence of one or more cations selected from Groups IA, IIA, and IIIA metals, among others. These cations are added to the substrate suspension as soluble salts, such as chlorides, nitrates, sulfates, among others. The cations can be added to the aqueous substrate suspension and/or to the Sn/Sb/salt solution. Without wishing to be bound by any theory or explanation, it is believed that the presence of at least one of these cations in the coating step is key in that the cations cause or induce the coating to form a coherent bond with the substrate. Group IIA metal cations, e.g., calcium and barium, are particularly useful for this purpose. The presence of such cations at concentrations from about 0.1 to 3.0M, and normally from about 1.0M to 2.0M, is effective to form a coating which is adequately bonded to the substrate.

The coated substrate particles are isolated from the suspension by any convenient solid-liquid separation procedure. The isolated particles are then washed with deionized water until substantially free from soluble residues, e.g., washed in the manner described in EPO '569, the teachings of which have been incorporated herein by reference. The isolated and washed particles can be dried. Drying can be conveniently accomplished in air at a temperature of up to about 120° C. However, a separate drying step is unnecessary when the washed coated particles are to be calcined immediately following isolating and washing.

The coated particles can be calcined in an oxygen-containing atmosphere, e.g., air, at a temperature, which ranges from about 400° to 900° C., for a time sufficient to obtain the desired crystalline morphology. While the particular calcination time can depend upon the geometry of the furnace, normally about 1 to 2 hours is adequate. Without wishing to be bound by any theory or explanation, it is believed that calcining the coated substrate particles atomically arranges the morphology of the coating, e.g., to form an antimony containing tin oxide coating which comprises $SnO_2(Sb)$ solid solution, thereby imparting the desired electroconductive property. For example, antimony may replace a certain number of tin atoms within a tin oxide ($SnO_2$) matrix, thereby causing the matrix to become electrically conductive. Calcination may be employed as one or more steps in order to tailor or modify the conductivity of the ECPs, e.g., previously calcined particles can be further calcined for increasing the conductivity of the ECPs.

Certain aspects of the invention are demonstrated by the following Example. It is to be understood that this Example is provided to illustrate and not limit the scope of the appended claims. Unless specified otherwise, the materials which were used in the Example are commercially available.

EXAMPLE

This example describes a coating process for preparing an ECP comprising titanium dioxide particles which have been coated with silica and an antimony containing tin oxide. The ratio of $SnO_2$ to Sb in the coating is about 10 to 1.0.

About 2.5 liters of deionized water, which had been heated to about 90° C. and kept in a four liter beaker, were admixed with about 188 grams of pigment grade $TiO_2$ powder, and 2 grams of triethanolamine in order to formed an aqueous suspension. During the suspension forming process, the $TiO_2$ pigment was agitated by being paddle stirred. The triethanolamine was added to enhance dispersion of the $TiO_2$ particles. About 220 grams of $CaCl_2$ was dissolved into the suspension, and then the pH of the suspension was brought to about 2.0 by the addition of about 20 ml of 20% HCl.

Next, an aqueous solution of $SnCl_4$, $SbCl_3$ and HCl was prepared by combining about 200 ml of an aqueous $SnCl_4$ solution, which contained the equivalent of about 0.40 g $SnO_2$/ml, with about 38 ml of an aqueous concentrated HCl solution of SbCl3, which contained the equivalent of about 0.27 grams Sb/ml. The resultant solution had a ratio of about 7.6 parts by weight of $SnO_2$ to 1 part by weight of Sb.

An aqueous solution of potassium silicate was prepared by dissolving about 20 grams of a commercially available stock solution, which contained $K_2SiO_3$ that had an $SiO_2/K_2O$ molar ratio of about 3.3 and about 26.5 wt % $SiO_2$, into about 600 ml of 20% NaOH.

The $SnCl_4/SbCl_3$/HCl solution was then added at a uniform rate into the agitated $TiO_2$ particle suspension over a period of about two hours. Concurrent with the addition of the $SnCl_4$ solution, the $K_2SiO_3$ solution was added to the agitated suspension. During the concurrent addition of these solutions, the pH of the suspension was maintained at about 2.0. The suspension was then cured by digesting, i.e., held at a fixed pH and temperature for permitting the surface chemistry to achieve a generally fixed state, for about 30 minutes, while agitating and maintaining the pH at about 2.0 and the temperature at about 90° C.

Solids formed in the suspension and were recovered by filtration. The solids were washed with deionized water until substantially free from chloride ions. The washed solids were dried by heating at a temperature of about 120° C. for about 8 hours. The dried powder weighed about 295 grams.

The procedures, which were used to ascertain the following characteristics of the ECP prepared by the Example, are described in detail in EPO '569; the teachings of which are incorporated by reference.

The surface area of the powder was about 49 m$^2$/g. The dried powder was calcined in air at about 750° C. for 2 hours. The surface area of the calcined product was about 29 m$^2$/g. The resistance of the calcined powder was about 38 ohms.

X-ray fluorescence analysis revealed that the powder contained approximately; 61.2% by weight $TiO_2$; 1.6% $SiO_2$; 31.3% $SnO_2$ and 3.7% $Sb_2O_3$. This corresponded to a weight ratio of about 10 parts of $SnO_2$ to 1 part Sb.

The ECP of the invention, can be used within a matrix comprising a paint system, which has a pigment to binder ratio that ranges from 10/200 to 200/100, and typical 25/100 to 100/100 parts by weight. Such a paint can result in films which have a Ransburg Number greater than 140. The procedure for measuring the Ransburg number is described in greater detail in EPO '569. The surface roughness of a paint system can be measured in microinches by using a Hobson-Taylor Surtronic 3 surface roughness tester, which was supplied by G. F. Maier Co, Edgemont, Pa. The surface roughness can range from about 3 to 20, and normally 3-7 microinches. Such a surface roughness permits this paint system to be employed in an end-use requiring a relatively smooth surface.

While certain embodiments of the invention have been described in detail one of ordinary skill would recognize that other embodiments and variations are encompassed by the appended claims.

The following is claimed:

1. A process for making an electroconductive powder comprising a particulate substrate and a coating comprising silica and an electroconducting network of antimony-containing tin oxide, said method comprising the steps of:
   (a) providing an aqueous suspension comprising the particulate substrate;
   (b) applying a coating comprising silica associated with a hydrous antimony-containing tin oxide onto the particulate substrate; wherein the silica and hydrous antimony-containing tin oxide are simultaneously applied onto the particulate substrate and wherein the pH of the suspension during said applying is maintained in the range of about 1.0 to about 4.0;
   (c) recovering solids from the suspension, washing said solids, and drying the recovered solids; and
   (d) calcining the recovered solids, thereby obtaining the electroconductive powder.

2. A process for making a coated powder comprising the steps of:
   (a) providing a suspension comprising at least one particulate substrate material,
   (b) applying a coating comprising amorphous silica associated with a hydrous antimony-containing tin oxide onto said particulate substrate; wherein the silica and hydrous antimony-containing tin oxide are simultaneously applied onto the particulate substrate and wherein the pH of the suspension during said applying is maintained in the range of about 1.0 to about 4.0,
   (c) recovering solids from the suspension, washing said solids, and;
   (d) heating the solids at a temperature and for a time sufficient to convert at least a portion of the hydrous antimony-containing tin oxide to an antimony-containing tin oxide,
   (e) optionally continuing said heating at a temperature and for a time sufficient to calcine at least a portion of said solids; thereby obtaining the coated powder.

3. The process of claim 1 or 2, wherein said providing comprises,
   forming an aqueous suspension comprising the particulate substrate, adding between about 0.1 and 3M of a soluble alkaline earth metal salt, and heating to a temperature between about 25° C. and 100° C.

4. The process of claim 1 or 2, wherein said applying comprises,
   adding an alkali silicate solution and an acidic mixture comprising at least one of $SnCl_4$, and $SbCl_3$, to the suspension of substrate particulates, wherein the temperature is between about 25° and 100° C.

5. The process of claim 1 or 2, wherein said calcining comprises heating said recovered solids to a temperature of about 500° to 900° C.

6. The process of claim 1 or 2, wherein said substrate comprises at least one material selected from the group consisting of oxides of titanium, magnesium, calcium, barium, strontium, zinc, tin, nickel and iron, mica, cordierite, anorthite, pyrophyllite, and sulfates of calcium, barium and strontium.

7. The process of claim 1 or 2, further comprising adding at least one cation to the suspension.

8. The process of claim 1 or 2, further comprising incorporating the powder into a matrix comprising a paint system having the powder and binder.

9. The process of claim 8 wherein the powder to binder ratio is about 10/200 to 200/100.

10. The process of claim 1 or 2, wherein the resistance of the powder ranges from about 1–2000 ohms.

11. The process of claim 1 or 2, wherein calcining is performed at a temperature of at least 400° C.

* * * * *